(12) United States Patent
Xu et al.

(10) Patent No.: US 8,848,057 B2
(45) Date of Patent: Sep. 30, 2014

(54) HOME SECURITY APPLICATIONS FOR TELEVISION WITH DIGITAL VIDEO CAMERAS

(75) Inventors: Ning Xu, Irvine, CA (US); Sangkeun Lee, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1489 days.

(21) Appl. No.: 11/448,206

(22) Filed: Jun. 6, 2006

(65) Prior Publication Data

US 2007/0126873 A1    Jun. 7, 2007

Related U.S. Application Data

(60) Provisional application No. 60/742,704, filed on Dec. 5, 2005.

(51) Int. Cl.
*H04N 7/18* (2006.01)
*H04N 9/47* (2006.01)
*G08B 13/196* (2006.01)
*G06K 9/00* (2006.01)

(52) U.S. Cl.
CPC .......... *H04N 7/181* (2013.01); *G08B 13/19636* (2013.01); *G08B 13/19619* (2013.01); *G08B 13/1961* (2013.01); *G08B 13/19691* (2013.01); *G06K 9/00221* (2013.01); *H04N 7/188* (2013.01)
USPC ........... 348/156; 348/143; 348/155; 348/152; 348/153

(58) Field of Classification Search
USPC .......... 348/143, 152, 156, 153, 155
See application file for complete search history.

(56) References Cited

U.S. PATENT DOCUMENTS

| | | | |
|---|---|---|---|
| 5,151,945 A * | 9/1992 | Lee et al. | 382/103 |
| 5,164,992 A | 11/1992 | Turk et al. | |
| 5,585,841 A | 12/1996 | Hardin | |
| 5,691,772 A | 11/1997 | Suzuki | |
| 5,799,111 A | 8/1998 | Guissin | |
| 5,819,035 A | 10/1998 | Devaney et al. | |
| 5,920,356 A | 7/1999 | Gupta et al. | |
| 6,389,177 B1 | 5/2002 | Chu et al. | |
| 6,583,813 B1 * | 6/2003 | Enright et al. | 348/150 |
| 6,643,410 B1 | 11/2003 | Yu et al. | |

(Continued)

FOREIGN PATENT DOCUMENTS

| | | |
|---|---|---|
| EP | 1168823 A2 | 1/2002 |
| JP | 2002-208073 A | 7/2002 |

(Continued)

OTHER PUBLICATIONS

Patent Cooperation Treaty; International Search Report and written opinion for PCT/KR2007/002188. Aug. 10, 2007.

(Continued)

*Primary Examiner* — Geepy Pe
(74) *Attorney, Agent, or Firm* — IP Investment Law Group (57) ABSTRACT

A system and method combine digital television together with a digital video camera and controller unit for using a digital video camera together with a digital television set as a home security system that allows stranger detection, fire detection, motion detection, etc. The detection results are used to make further decisions such as display or record some of the scenes.

26 Claims, 7 Drawing Sheets

130

(56) References Cited

U.S. PATENT DOCUMENTS

| | | |
|---|---|---|
| 6,795,106 B1 | 9/2004 | Cooper |
| 6,898,321 B1 | 5/2005 | Knee et al. |
| 7,097,102 B2 | 8/2006 | Patel et al. |
| 7,120,278 B2 | 10/2006 | Sukegawa et al. |
| 7,170,933 B2 | 1/2007 | Kouloheris et al. |
| 7,260,823 B2 | 8/2007 | Schlack et al. |
| 7,310,442 B2 * | 12/2007 | Monachino et al. .......... 382/156 |
| 7,630,561 B2 | 12/2009 | Porter et al. |
| 7,636,456 B2 | 12/2009 | Collins et al. |
| 7,643,658 B2 | 1/2010 | Kilner et al. |
| 7,734,098 B2 | 6/2010 | Kikkawa et al. |
| 2003/0062997 A1* | 4/2003 | Naidoo et al. ................ 340/531 |
| 2003/0071908 A1 | 4/2003 | Sannoh et al. |
| 2004/0130620 A1 | 7/2004 | Buehler et al. |
| 2004/0233983 A1 | 11/2004 | Crawford et al. |
| 2005/0013494 A1 | 1/2005 | Srinivasan et al. |
| 2005/0254782 A1 | 11/2005 | Hsu |
| 2006/0251382 A1 | 11/2006 | Vronay et al. |
| 2007/0058726 A1 | 3/2007 | Ha et al. |
| 2007/0206871 A1 | 9/2007 | Jalil et al. |
| 2007/0237241 A1 | 10/2007 | Ha et al. |
| 2007/0280552 A1 | 12/2007 | Lee et al. |

FOREIGN PATENT DOCUMENTS

| | | |
|---|---|---|
| JP | 2004-128648 A | 4/2004 |
| JP | 2004-350275 A | 12/2004 |
| JP | 2005-071064 A | 3/2005 |
| KR | 20000033070 A | 6/2000 |
| KR | 20020036867 A | 5/2002 |
| KR | 10-2004-0060521 | 7/2004 |
| WO | 0022834 A2 | 4/2000 |
| WO | 03010716 A2 | 2/2003 |
| WO | 2005060272 A1 | 6/2005 |
| WO | 2005111938 A2 | 11/2005 |

OTHER PUBLICATIONS

Office Action for Application No. MX/a/2008/015605 dated Jul. 1, 2010.

Office Action dated Jan. 21, 2013 for Korean application 10-2006-0122584.

Wang, Z. et al., "Blind Measurement of Blocking Artifacts in Images," Proceedings of the 2000 International Conference on Image Processing (ICIP 2000), IEEE, Sep. 2000, vol. 3 pp. 981-984, United States.

Wang, Z. et al., "No-Reference Perceptual Quality Assessment of JPEG Compressed Images," Proceedings of the 2002 International Conference on Image Processing (ICIP 2002), IEEE, Sep. 2002, vol. 2 pp. I-447-I-480, United States.

* cited by examiner

HOME SECURITY APPLICATIONS FOR TELEVISION WITH DIGITAL VIDEO CAMERAS

RELATED APPLICATION

This application claims priority, under 35 U.S.C. 119(e), of U.S. provisional patent application Ser. No. 60/742,704, filed on Dec. 5, 2005, incorporated herein by reference in its entirety.

FIELD OF THE INVENTION

The present invention relates generally to television systems and, more particularly, to applications and systems for televisions that have a digital video camera attached.

BACKGROUND OF THE INVENTION

There have been many research achievements in vision technologies and some of them have become feasible for practical applications, such as face detection and recognition. At the same time, digital video cameras, especially the low resolution Web cameras (webcams), are made very cheap and have become largely available for daily applications in the price aspect.

Such cameras can be useful for home security. Many home security systems are already available in the market and installed in many homes. However, most of these home security systems do not include intelligent video surveillance, which is still far beyond the price range of average homes. As digital television replaces conventional televisions, as digital video cameras become inexpensive and largely available, and as vision technologies become ready for video surveillance applications, the need for inexpensive security systems with intelligent video surveillance abilities is even more evident.

BRIEF SUMMARY OF THE INVENTION

An object of the present invention is to provide new systems and applications that combine digital television together with a digital video camera and a controller unit. In one embodiment, the present invention provides systems and related methods and applications for using a digital video camera together with a digital television set controlled by a controller unit.

In one implementation, the present invention provides a system for a home securtiy application, which involves a television with digital video cameras installed, Systems and related methods for using digital video camera together with a television set for home security, i.e. the video surveillance applications, are provided. Combinations of televisions and video cameras allow new applications for home security. A home security system according to the present invention is able to monitor the scenes where the video cameras are installed, automatically detect particular special events such as fire, stranger approaching, etc., feed the scenes to the television, automatically record those events and log the scene every certain period.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

In one embodiment of the present invention, the present invention provides a security surveillance system utilizing a digital television for display video from a digital camera, and a remote control to interact with the surveillance system.

Digital cameras, such as Web cams, are made smaller and can be installed inconspicuously. Further, research achievements in vision technologies, such as object recognition and motion detection, are available.

In one embodiment, the present invention provides a home security surveillance system that combines digital televisions in the living room, digital video cameras, and vision technologies, to provide home security.

Figure 1:
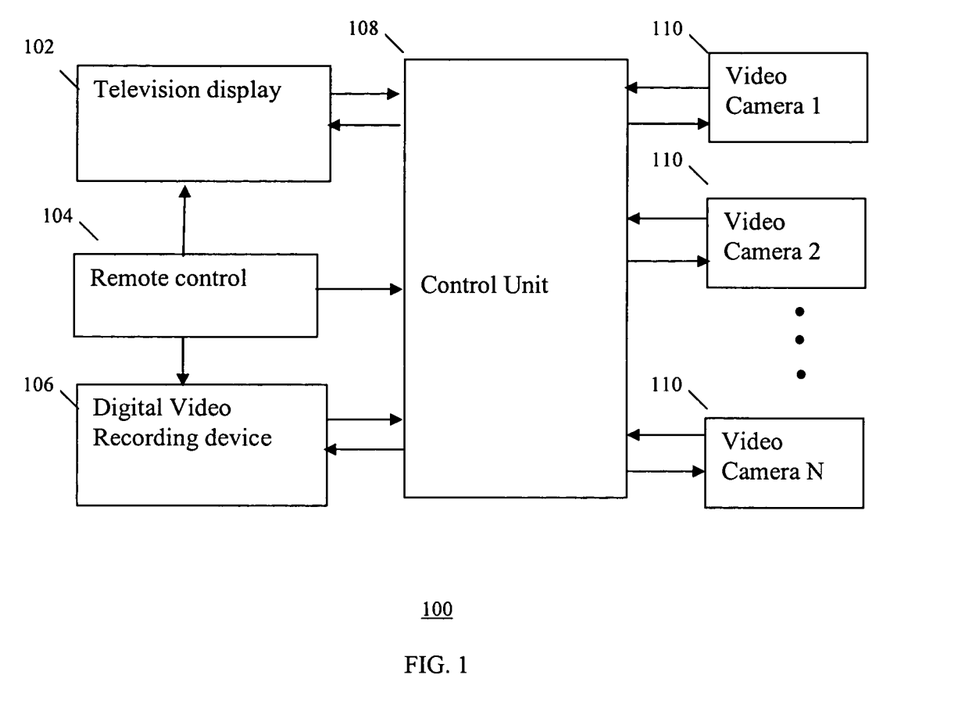
FIG. 1 shows a functional block diagram for an implementation of a home security surveillance system, according to an embodiment of the present invention.

FIG. 1 shows a functional block diagram for an implementation of a home security surveillance system 100, according to an embodiment of the present invention. The system 100 comprises audio/visual (A/V) devices including television display (digital or conventional set) 102, digital video recording device 106, and video cameras 110. The system 100 further includes a remote control 104, and a controller unit (module) 108 which can comprise a stand-alone device, or be integrated in the television 102, in a set-top box, in the digital video recording device 106, etc.

The television 102 is controlled by a control signal of the controller unit 108, and may display video signals from the controller unit 108. The digital video recording device 106 records special events and records images from video cameras 110 at certain moments in time. The controller unit 108 controls the video cameras 110 and sends video signals and control signals to both the television display 102 and the digital video recording device 106. The remote control 104 is used to control the television display 102, the controller unit 108 and the digital video recording device 106. The digital video cameras 110 are installed in places of interest, and are connected to the controller unit 108.

The digital video cameras 110 can be installed at any place within the range of a cable connection to the television 102. Wireless digital video cameras can also be installed to increase range and for convenient installation. For wireless video cameras, as shown by example in FIG. 2, a base receiver 112 of a wireless video camera 110 can be connected to the controller unit 108 while the wireless video cameras 110 are installed elsewhere.

Figure 2:
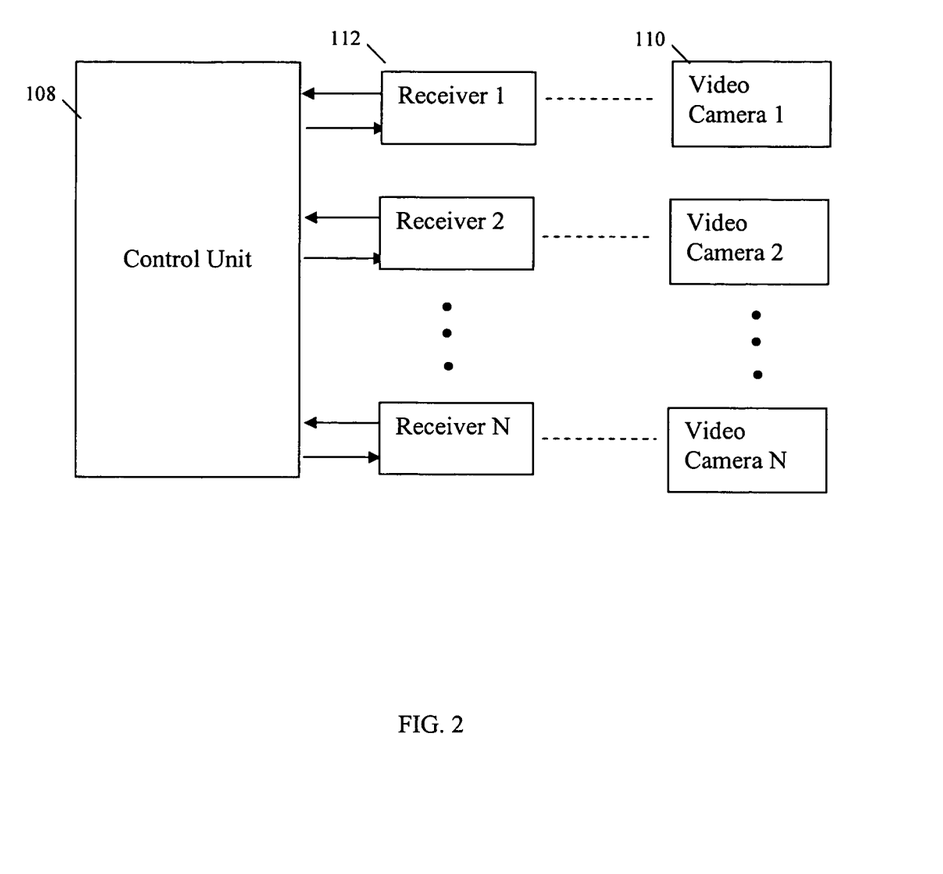
FIG. 2 shows a functional block diagram for using wireless video cameras that transmit video signals to base receivers connected to the controller unit in FIG. 1, according to an embodiment of the present invention.

Regardless of the camera type (wireless or wired), the controller unit 108 can send control signals to the video cameras 110 to switch each camera on/off one by one or all together. Video signals from the digital video cameras 110 are sent to the controller unit 108, to be processed. Based on the settings or the command from the remote control 104, the controller unit 108 can output video signals to the television display 102 and to the digital video recording device 106 for recording. Control signals can also be generated by the controller unit 108 itself based on the settings and the content of the video signals from the video cameras 110, and be sent to the television display 102 and/or the digital video recording device 106.

As noted, the controller unit 108 is described herein as a logical device, and can be a stand alone device, integrated in a set top box, integrated in the digital television display, or even integrated in the digital video recording device. The function of the controller unit 108 described herein applies regardless of the physical implementation of the controller unit 108.

Figure 3:
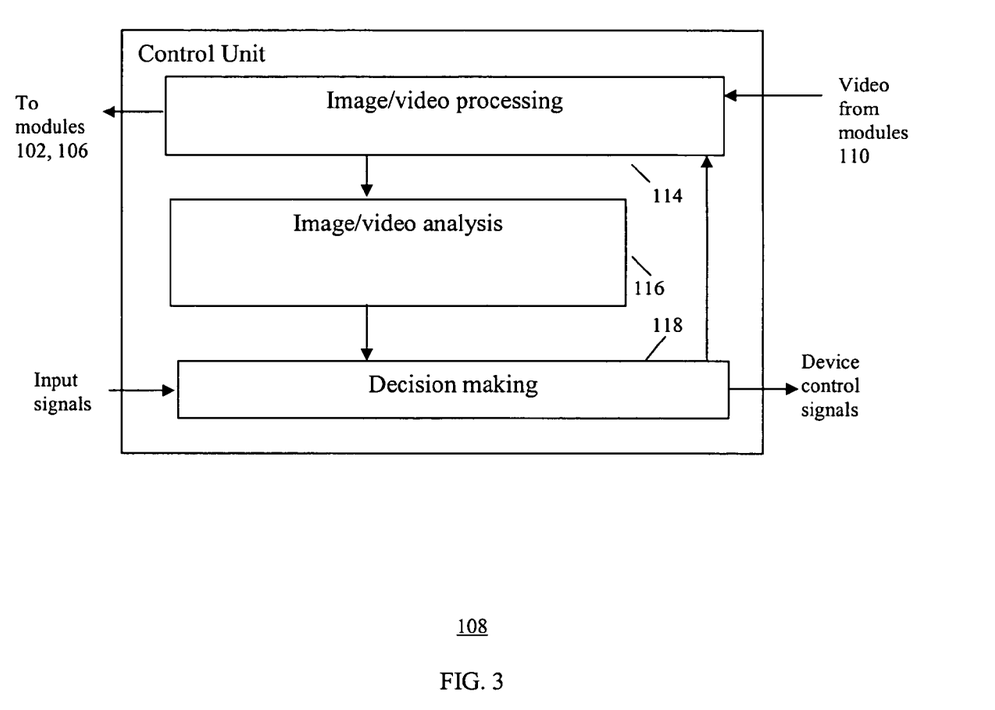
FIG. 3 shows a functional block diagram of an example implementation the controller unit of FIG. 1, according to an embodiment of the present invention.

FIG. 3 shows a functional block diagram of an example implementation the controller unit 108, according to an embodiment of the present invention. The controller unit (module) 108 performs functions including controlling the television 102 and the recording device 106, and performs event detection such as stranger detection, fire detection, motion detection, etc.

In the example of FIG. 3, the controller unit 108 includes an image/video processing module 114, an image/video analysis module 116 and a decision making module 118. Video signals come from the digital video cameras 110 and are feed into the image/video processing module 114 and then output from the image/video processing module 114 to both the television 102 and the recording device 106. The image/video processing module 114 is coupled to the image/video analysis module 116. The decision making module 118 is coupled to the image/video processing module 114. The image/video processing module 114 is coupled to the digital video recording device 106.

Upon receiving the video stream output from the digital video cameras 110, the image/video processing module 114 processes the video streams based on the settings or control signals from the decision making block 118. For example, if the whole system is set to monitor all the video cameras 110, the input video streams are tiled together to a proper resolution so that they can be seen on the television 102. In this case, the image/video processing module 114 perform scaling and frame rate conversion to generate new video in a format that is acceptable by the television 102.

Figure 4:
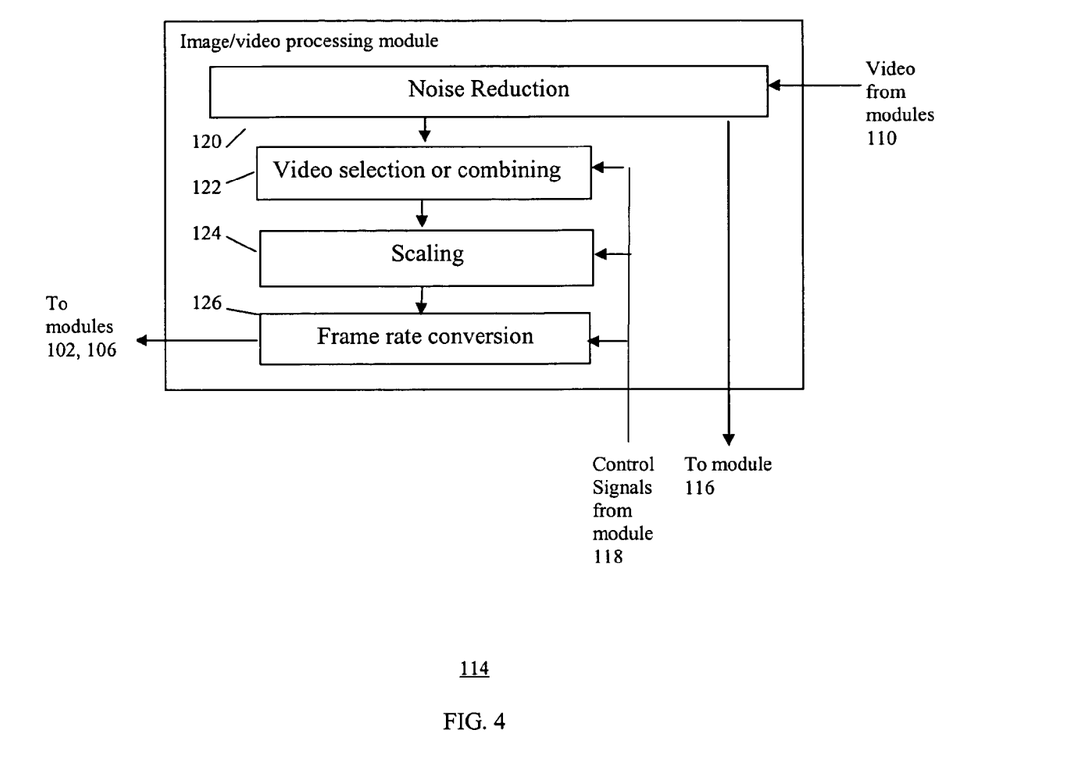
FIG. 4 shows a functional block diagram of the image/video processing module of the controller unit of FIG. 1, according to an embodiment of the present invention.

FIG. 4 shows a functional block diagram of the image/video processing module 114, according to an embodiment of the present invention. The image/video processing module includes a noise reduction module 120, a video selection or combining module 122, a scaling module 124 and a frame rate conversion module 126.

The noise reduction module 120, processes the input video signals from the digital video cameras 110 to reduce the signal noise and the compression noise from the digital video cameras. An output from the noise reduction module 120 is provided to the image/video analysis module 116 in the controller unit 108 directly.

Based on control signals coming from the decision making module 118 of the controller unit 108, the noise reduced video signals are sent to the video selection and/or combining module 122 which combines selected video signals together. The combined video signals are then scaled by the scaling module 124 to a proper resolution, and the frame rate conversion module 126 converts the combined and scaled video signal to a proper frame rate so that the output signal can be displayed on the television display 102.

Figure 5:
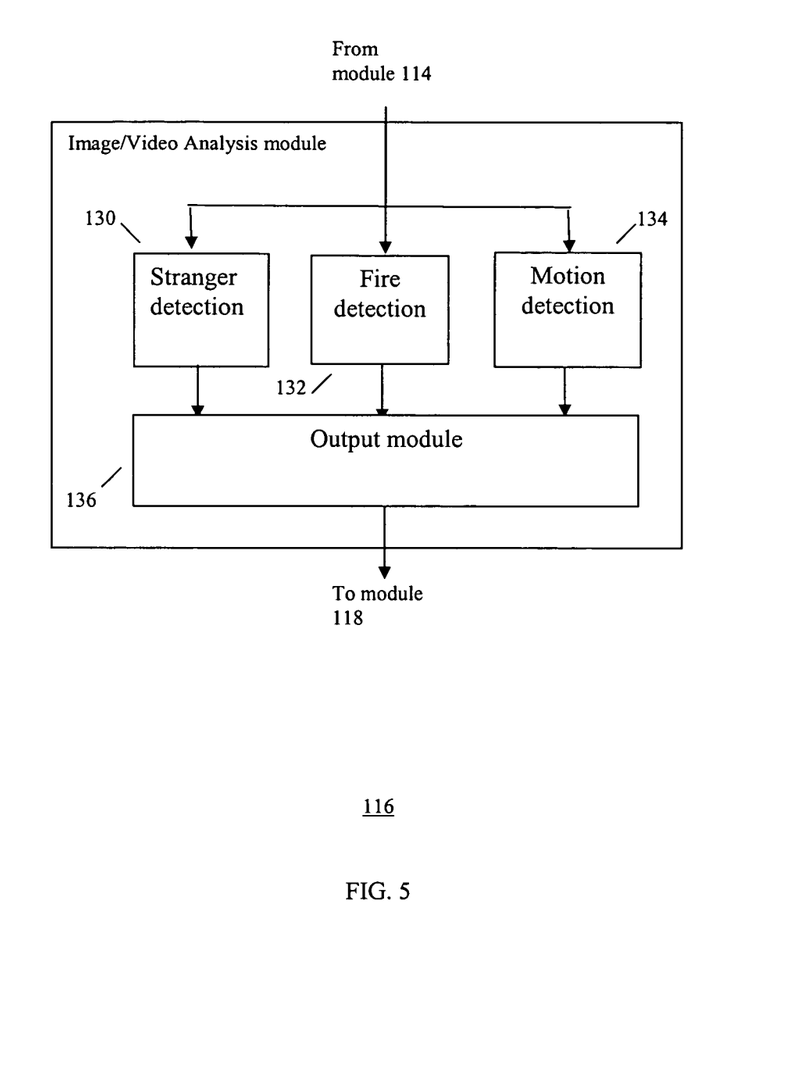
FIG. 5 shows a functional block diagram of an embodiment of an image/video analysis module of the controller unit of FIG. 2, according to an embodiment of the present invention.

Referring back to FIG. 3, the image/video analysis module 116 receives video signals after noise reduction from the image/video processing module 114. FIG. 5 shows a functional block diagram of an embodiment of the image/video analysis module 116, according to an embodiment of the present invention. The image/video analysis module 116 performs event detection, and comprises a stranger detection module 130, a fire detection module 132, a motion detection module 134 and an output module 136. As those skilled in the art will recognize, the image/video analysis module 116 can include different and/or additional analysis modules. As such, other analysis/detection modules for particular event detection can also be added to module 116 in other embodiments.

The output of each of the modules 130-134 is whether a specific event is detected in the scene or not, and in which camera 110 the detected scene is captured. The output module 136 integrates the results from all the modules 130-134 and outputs the information to the decision making module 118 in the controller unit 108.

Figure 6:
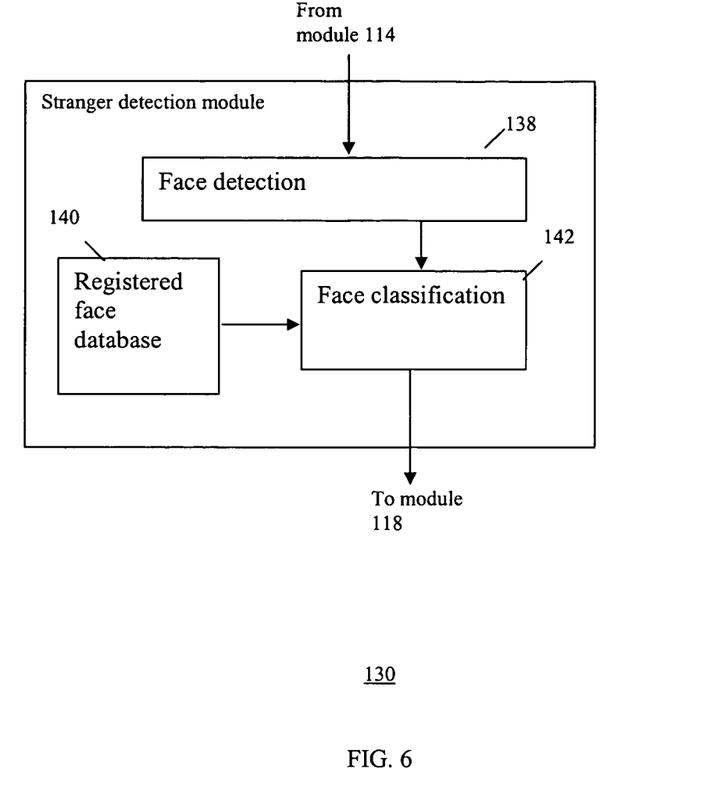
FIG. 6 shows a functional block diagram of an embodiment of a stranger detection module of the Image/Video Analysis module of FIG. 5, according to an embodiment of the present invention.

The stranger detection module 130 further includes face detection and face classification modules. FIG. 6 shows a functional block diagram of an embodiment of the stranger detection module 130, according to an embodiment of the present invention. The stranger detection module 130 comprises a face detection module 138, a registered face database 140, and a face classification module 142. The face detection module 138 can be coupled to the image/video processing module 114 and the face classification module 142. The face classification module 142 can further be coupled to the registered face database 140 and the decision making module 118.

A face in the scene, detected by the face detection module 138, is compared to registered faces in the database 140 to determine whether the face is from a stranger or not. As such, in each scene captured by the digital video camera 110, the face detection module 138 detects whether there is any face in the scene, and if so, the face classification module 142 classifies the detected face into two classes, one is the family member class, the other is the stranger class. Family members should have registered their faces in the database 140 so that the face classification module 142 can perform as expected. If a stranger is detected in the scene, the image/video analysis module 130 sends a signal to the decision making module 118 together with the signal identifying which scene contains the stranger.

The fire detection module 132 detects whether there is a fire event in the scene, which is in particular useful for the surveillance of the front yard and back yard. Once there is a fire event detected, the image/video analysis module 116 sends a signal to the decision making module 118 together with the signal identifying which scene contains the fire event.

The motion detection module 134 is for a more general purpose, and detects the difference between successive frames of each scene to determine whether anything has changed in the scene. Once there is a detected change in the scene, the image/video analysis module 116 sends a signal to the decision making module 118 together with the signal identifying which scene contains the motion, i.e. the scene change.

The decision making module 118' of the controller unit 108 implements a flexible logic that can be set by the user through the remote control 104. The inputs to the decision making module 118 include status signals and commands from remote control including the status of the television display, the status of the digital video recording device, and the command from the remote control. The remote control 104 is coupled to the decision making module 118.

Outputs of the decision making module 118 include: a control signal to the image/video processing module 114 to control the output video signals, and device control signals including signals to control the digital video cameras, signals to control the television and digital video recording device.

In example, the decision making module 118 implements the following decision logics:
1. If a command is sent from the remote control 104, follow the command. This command may include: turning on and off each digital video camera 110 or all the cameras 110; monitoring all or some of the scenes; recording some or all of the scenes captured by the video cameras 100.
2. If there is a special event detected by the image/video analysis module 116, send signal to image/video processing module 114 to convert the scene(s) containing the special event, combine if necessary, and output to the television display 102 with a picture in picture (PIP) mode; at the same time, record the scenes in the digital video recording device 106. The image/video processing module 114 can combine, if necessary, any combination of input signals being supplied to the television display 102 including inputs from individual cameras, from television display content, such as television broadcast signals or a media player, or a combination thereof according to formats related to the PIP mode. The image/video processing module 114 can output the combination to the television display 102 with the PIP mode.
3. If the television 102 is turned off, based on the setting, output a signal to turn it on and/or deliver a preset alarm sound.
4. Based on the setting, record the scenes to the digital video recording device 106 every particular amount of time, and/or every smaller amount of time when there is motion detected in the scene.

As shown in FIG. 6, the stranger detection module 130 includes the face detection module 138. There are many approaches for the face detection. Any of the working approaches can be implemented by the face detection module 138. In this example, a simple face detection method is briefly described, as shown by the example flowchart in FIG. 7.

Figure 7:
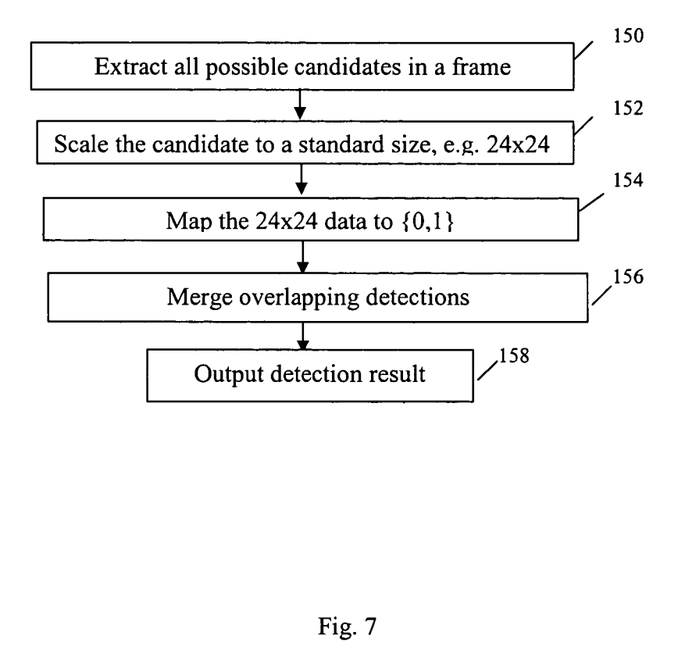
FIG. 7 shows an example flowchart of the steps of face detection in the stranger detection module, according to an embodiment of the present invention.

All the candidates in a scene input frame are tested by mapping to a binary value, and detected multiple overlapped faces are merged together to obtain a single output. As such, for each input frame, every possible face candidate, no matter the size and location, is extracted from the luminance component of the input image for testing (step 150). The candidate image window is first scaled to a standard size, for example, 24×24 (step 152). Therefore, there will be a 24×24=384 different grayscale values for each candidate. The 384 different grayscale values are then passed through a function $F_d$ that inputs these grayscales I and outputs a scale value, which is then thresholded to obtain a binary result $d=F_d(I)$ (step 154). If the result is 1, then the candidate is detected as a face, otherwise, it is not a face. The function used to map a standard size window of grayscale values to a binary range includes a set of parameters, which can be obtained offline.

During offline training for the parameters of $F_d$, we manually label a large number of faces $f_i$, $1 \le i \le N_f$, and non-faces $n_j$, $1 \le j \le N_n$, where $N_f$ is the number of face samples and the $N_n$ is the number of non-face samples. We find a set of optimal parameters of $F_d$, such that the detection error for the samples is minimized, as:

$$\hat{\Theta} = \operatorname*{argmin}_{\Theta} \left( \sum_{j=1}^{N_n} F_d(\Theta, n_j) - \sum_{i=1}^{N_f} F_d(\Theta, f_i) \right),$$

where $\Theta$ is the parameter set of the function $F_d$. Any of the available face detection approaches can be used to obtain a function $F_d$ together with a set of minimizing parameters.

For a real face in a video frame, there may be many candidates around this face being detected as a face. These detections have overlaps and are then merged together (in step 156) based on the overlapping to a single detection and this single detection result is output (in step 158) to face classification.

Before face classification, we need to register all desired (e.g., friend, family members, etc.) faces in the database 140, so that the detected face will then be classified as known or stranger. If the face detected does not match any face in the database 140, it will be detected as a stranger.

To register a face in the database 140, the remote control 104 is used to enter a face registration mode. In this mode, the television 102 shows images directly from a selected video camera 110 in front of which a person is standing. The user can freeze the image once a good view is captured. The face is detected by the face detection module 138 and marked with a box, which is then confirmed via the remote control 104. After confirmation, the detected face is scaled to a standard size and then stored in the database 140.

After the registration of all faces is done, face classification module 142 determines if a detected face is registered or a stranger. The simplest method for face classification comprises computing the Euclidean distance between a detected (candidate) face and the stored registered faces, to determine the smallest distance and compare this distance to a threshold. If all distance is larger than the threshold, then a stranger is detected. Other classification methods can also be used.

Similar to face detection, there are many available approaches for detecting fire in a scene. Any of such approaches can be utilized in the fire detection module 132. In one example, a two-step fire detection method is used. The first step is color matching and the second step is appearance matching. Usually, fire has a red color which can be identified in the scene. However, not all red color part is fire. As such, color matching is performed to identify the areas that are in red color. Specifically, a region is set for the fire color and if a particular color is within this region, it is regarded as fire color. When the concentration of the red color in a small candidate area is more than a selected threshold, the region is matched using an appearance matching method.

In appearance matching, only the luminance information is used. Appearance matching is similar to face detection described above. A classifier is trained offline with a large amount of fire examples and non-fire examples. The classifier then makes decision for each candidate area whether it is fire or not. For fire detection, there is no need to check all the possible candidates within a scene frame, but only those areas that pass the color matching test.

Similar to face detection and fire detection, there are many available approaches for motion detection, which can be implemented in the motion detection module 134. Any of such approaches can be utilized. In one example, a simple motion detection is utilized, which includes four steps. In the first step, the luminance change of two consecutive scene frames $I_i$ and $I_{i+1}$ is adjusted by computing the total luminance value of each frame as $L_i$ and $L_{i+1}$, respectively, and adjusting the frame $I_{i+1}$ as:

$$\hat{I}_{i+1} = \frac{L_i}{L_{i+1}} I_{i+1}.$$

In the second step, the difference between frame $I_i$ and adjusted frame $\hat{I}_{i+1}$ is determined as:

$$D = |\hat{I}_{i+1} - I_i|.$$

In the third step, the entries of the difference D are compared to a preset threshold T, to obtain a binary map as:

$$B(x, y) = \begin{cases} 1 & \text{if } D(x, y) > T \\ 0 & \text{if } D(x, y) \leq T. \end{cases}$$

In the last step, motion is determined based on the summation of the binary map B and another preset threshold $T_1$, i.e., if $$\sum_{x,y} B(x, y) > T_1,$$

there motion is detected in the scene, otherwise, no motion is detected.

As such, the present invention provides approaches for the combination of digital video cameras with televisions and digital recording devices for the purpose of home security using a controller unit. Many intelligent video surveillance tasks can be performed and the television display and the digital recording devices are utilized accordingly. A home security system is provided that provides stranger detection, fire detection, motion detection, etc. The detection results are used to make further decisions such as display or record some of the scenes.

While the present invention is susceptible of embodiments in many different forms, these are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A security and surveillance system, comprising a control unit configured to:

determine a special event occurrence observed, including detecting a face using a function $F_d$ according to:

$$\hat{\Theta} = \arg_\Theta \min \left( \sum_{j=1}^{N_n} F_d(\Theta, n_j) - \sum_{i=1}^{N_f} F_d(\Theta, f_i) \right)$$

wherein $n_j$ is a non-face of $N_n$ non-face samples, $f_i$ is a face of $N_f$ face samples, and with a parameter $\Theta$ having minimized detection error, and with a first camera of one or more digital video cameras based on video signals from the first camera; and feed a combination of a television display content and a video stream from the first camera to a television display located in a home when the special event occurrence is determined.

2. The system of claim 1 wherein the control unit is configured to control the one or more of the digital video cameras, the television display, or a combination thereof based on user commands.

3. The system of claim 1 wherein the control unit is configured to process video streams from the digital video cameras, the video streams are tiled together to a proper resolution.

4. The system of claim 1 wherein the first camera is installed remote from and is connected to the television display.

5. The system of claim 1 wherein the control unit is configured to control one or more of the one or more of the digital video cameras, the television display, or a combination thereof based on the special event occurrence.

6. The system of claim 5 wherein the control unit is configured to receive a command to control the one or more of the digital video cameras, the television display, or a combination thereof and the decision making module.

7. The system of claim 6 wherein the control unit is configured to control the one or more of the digital video cameras, the television display, or a combination thereof further based on user commands from the remote control module.

8. The system of claim 7 further comprising a digital video recording device, coupled to the control unit, configured to record video signals from the one or more of the digital video cameras and plays back recorded video signals on the television display.

9. The system of claim 8 wherein the one or more of the digital video cameras, the television display, the digital video recording device, or a combination thereof exchange signals therebetween via the image and video processing module.

10. The system of claim 5 wherein the control unit is configured to process signals from the one or more of the digital video cameras before analysis and provide one or more of noise reduction, video selection and combining, scaling, and frame rate conversion.

11. The system of claim 10 wherein the control unit is configured to control the image and video processing module.

12. The system of claim 5 wherein the control unit is configured to perform one or more of stranger detection, fire detection and motion detection.

13. The system of claim 12 wherein the control unit is configured to:

detect as stranger a person, in a scene from the first camera, who is not registered in a database;

detect presence of fire in the scene from the first camera; and detect presence of motion in scenes from the first camera.

14. The system of claim 13 wherein the control unit is configured to integrate the results from said detection modules and for providing the integrated results to the decision making module.

15. The system of claim 13 wherein the control unit is configured to:

detect an individual's face in the scene from the first camera; and classify the individual's face as a stranger's face when the individual's face is not among images of registered individuals' faces.

16. A security and surveillance system, a control unit configured to:

determine a special event occurrence observed, including detecting a face using a function $F_d$ according to:

$$\hat{\Theta} = \arg_\Theta \min \left( \sum_{j=1}^{N_n} F_d(\Theta, n_j) - \sum_{i=1}^{N_f} F_d(\Theta, f_i) \right)$$

wherein $n_j$ is a non-face of $N_n$ non-face samples, $f_i$ is a face of $N_f$ face samples, and with a parameter $\Theta$ having minimized detection error, and with a first camera of one or more digital video cameras based on video signals from the first camera;

feed a combination of a television display content and a video stream from the first camera to a television display located in a home, the video stream from the first camera to a digital recording device, or both when the special event occurrence is determined; and control the television display, the one or more of the digital video cameras, the digital recording device, or a combination thereof accordingly based on preset logic.

17. The system of claim 16, wherein the control unit is configured to:

output a video signal from one or more cameras to the television display using a picture in picture function; and start a recording on the digital recording device to record a video signal and setting an interval for recording a scene based on a detected motion in the scene.

18. The system of claim 16 wherein the control unit is implemented in the television display.

19. The system of claim 16 wherein the control unit is implemented as a stand alone device.

20. The system of claim 16 wherein the control unit is implemented in the digital recording device.

21. The system of claim 16 wherein the one or more digital video cameras includes a wireless camera having a receiving base station connected to the image and video processing module.

22. The system of claim 16 wherein the control unit is configured to perform one or more of stranger detection, fire detection, and motion detection.

23. A method of operation for a surveillance system comprising of:

receiving video signals from a digital video camera for feeding the video signals to a television display located in a home;

determining a special event occurrence observed with the digital video camera detecting based on the video signals includes detecting a face using a function $F_d$ according to:

$$\hat{\Theta} = \arg_\Theta \min \left( \sum_{j=1}^{N_n} F_d(\Theta, n_j) - \sum_{i=1}^{N_f} F_d(\Theta, f_i) \right)$$

wherein $n_j$ is a non-face of $N_n$ non-face samples, $f_i$ is a face of $N_f$ face samples, and with a parameter $\Theta$ having minimized detection error; and performing an intelligent task including feeding a combination of a television display content and a video stream from the digital video camera to the television display when the special event occurrence is determined.

24. The method of claim 23 wherein the step of determining further includes the steps of:

stranger detection when a person, in a scene from a camera, is not registered in a database;

detecting fire in a scene from the camera; and detecting presence of motion in scenes from the camera.

25. The method of claim 23 wherein the step of performing the intelligent task further includes the steps of starting to record a scene.

26. The method of claim 23, wherein the steps of performing the intelligent task includes the steps of:

feeding the video signals from the camera to the television display.

* * * * *